(12) United States Patent
Sung et al.

(10) Patent No.: US 9,025,819 B2
(45) Date of Patent: May 5, 2015

(54) APPARATUS AND METHOD FOR TRACKING THE POSITION OF A PERIPHERAL VEHICLE

(71) Applicant: Hyundai Motor Company, Seoul (KR)

(72) Inventors: Kap Je Sung, Gyeonggi-do (KR); Joong Ryoul Lee, Gyeonggi-do (KR); Jun Sik An, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 44 days.

(21) Appl. No.: 13/705,482

(22) Filed: Dec. 5, 2012

(65) Prior Publication Data
US 2014/0119597 A1    May 1, 2014

(30) Foreign Application Priority Data

Oct. 31, 2012   (KR) .......................... 10-2012-0122043

(51) Int. Cl.
G06K 9/00 (2006.01)
G06T 7/20 (2006.01)
(52) U.S. Cl.
CPC .............. *G06T 7/20* (2013.01); *G06K 9/00805* (2013.01)
(58) Field of Classification Search
None
See application file for complete search history.

(56) References Cited

U.S. PATENT DOCUMENTS

| 8,395,490 | B2 * | 3/2013 | Yuda | 340/436 |
|---|---|---|---|---|
| 8,593,519 | B2 * | 11/2013 | Tauchi et al. | 348/148 |
| 8,620,023 | B1 * | 12/2013 | Plotke | 382/103 |
| 8,848,050 | B2 * | 9/2014 | Ichinose et al. | 348/118 |
| 2002/0080279 | A1 * | 6/2002 | Wang et al. | 348/584 |
| 2002/0196340 | A1 * | 12/2002 | Kato et al. | 348/148 |
| 2005/0163343 | A1 * | 7/2005 | Kakinami et al. | 382/103 |
| 2005/0195383 | A1 * | 9/2005 | Breed et al. | 356/4.01 |
| 2006/0204039 | A1 * | 9/2006 | Maemura et al. | 382/104 |
| 2007/0009137 | A1 * | 1/2007 | Miyoshi et al. | 382/104 |
| 2007/0013497 | A1 * | 1/2007 | Watanabe | 340/435 |
| 2007/0081262 | A1 * | 4/2007 | Oizumi et al. | 359/843 |
| 2007/0165910 | A1 * | 7/2007 | Nagaoka et al. | 382/104 |
| 2007/0182528 | A1 * | 8/2007 | Breed et al. | 340/435 |
| 2007/0188347 | A1 * | 8/2007 | Schofield | 340/903 |
| 2007/0222662 | A1 * | 9/2007 | Toennesen et al. | 342/27 |
| 2007/0230745 | A1 * | 10/2007 | Sawaki et al. | 382/104 |
| 2008/0040004 | A1 * | 2/2008 | Breed | 701/45 |

(Continued)

FOREIGN PATENT DOCUMENTS

| JP | 2004247921 A | 9/2004 |
|---|---|---|
| JP | 2011070593 A | 4/2011 |

(Continued)

*Primary Examiner* — Sumati Lefkowitz
*Assistant Examiner* — Thomas A James
(74) *Attorney, Agent, or Firm* — Mintz Levin Cohn Ferris Glovsky and Popeo, P.C.; Peter F. Corless

(57) ABSTRACT

The present disclosure provides an apparatus and a method for tracking a position of a peripheral vehicle. The apparatus includes: a processor; memory; an image obtaining unit configured to receive one or more images from one or more cameras disposed on a vehicle; a peripheral vehicle detecting unit configured to analyze the one or more images to detect a peripheral vehicle in the peripheral one or more images; a position tracking unit configured to track the peripheral vehicle detected in the peripheral one or more images; a view converting unit configured to generate a view-converted image by converting a view of the peripheral image based on the tracked position of the peripheral vehicle; and an output controlling unit configured to output the view-converted image to a display provided in the vehicle.

10 Claims, 6 Drawing Sheets

(56) References Cited

U.S. PATENT DOCUMENTS

| | | | |
|---|---|---|---|
| 2008/0043113 A1* | 2/2008 | Ishii | 348/218.1 |
| 2008/0048119 A1* | 2/2008 | Tissot | 250/332 |
| 2008/0136612 A1* | 6/2008 | Machii et al. | 340/435 |
| 2008/0137910 A1* | 6/2008 | Suzuki et al. | 382/104 |
| 2008/0186204 A1* | 8/2008 | Buckley | 340/901 |
| 2008/0205706 A1* | 8/2008 | Hongo | 382/104 |
| 2008/0231703 A1* | 9/2008 | Nagata et al. | 348/148 |
| 2008/0243390 A1* | 10/2008 | Nakamori | 701/301 |
| 2008/0285798 A1* | 11/2008 | Kubota | 382/103 |
| 2008/0304705 A1* | 12/2008 | Pomerleau et al. | 382/103 |
| 2009/0015675 A1* | 1/2009 | Yang | 348/148 |
| 2009/0048768 A1* | 2/2009 | Taguchi | 701/117 |
| 2009/0059005 A1* | 3/2009 | Hattori et al. | 348/148 |
| 2009/0079553 A1* | 3/2009 | Yanagi et al. | 340/435 |
| 2009/0096634 A1* | 4/2009 | Emam et al. | 340/901 |
| 2009/0099728 A1* | 4/2009 | Ichinose et al. | 701/39 |
| 2009/0112389 A1* | 4/2009 | Yamamoto et al. | 701/29 |
| 2009/0140881 A1* | 6/2009 | Sakai et al. | 340/435 |
| 2009/0140887 A1* | 6/2009 | Breed et al. | 340/990 |
| 2009/0297041 A1* | 12/2009 | Nagamine et al. | 382/209 |
| 2010/0002081 A1* | 1/2010 | Pawlicki et al. | 348/148 |
| 2010/0066527 A1* | 3/2010 | Liou | 340/461 |
| 2010/0134325 A1* | 6/2010 | Gomi et al. | 340/995.14 |
| 2010/0201508 A1* | 8/2010 | Green et al. | 340/435 |
| 2010/0253784 A1* | 10/2010 | Oleg | 348/187 |
| 2010/0277297 A1* | 11/2010 | Eckel et al. | 340/435 |
| 2010/0283845 A1* | 11/2010 | Yokochi et al. | 348/135 |
| 2010/0292895 A1* | 11/2010 | Nakamura et al. | 701/41 |
| 2011/0007163 A1* | 1/2011 | Sakurai | 348/148 |
| 2011/0018991 A1* | 1/2011 | Watanabe et al. | 348/118 |
| 2011/0025483 A1* | 2/2011 | Yano et al. | 340/436 |
| 2011/0080304 A1* | 4/2011 | Toledo et al. | 340/932.2 |
| 2011/0128136 A1* | 6/2011 | Katoh et al. | 340/435 |
| 2011/0169958 A1* | 7/2011 | Imai et al. | 348/149 |
| 2011/0216201 A1* | 9/2011 | McAndrew et al. | 348/148 |
| 2011/0228980 A1* | 9/2011 | Ichikawa et al. | 382/103 |
| 2011/0251768 A1* | 10/2011 | Luo et al. | 701/70 |
| 2011/0293145 A1* | 12/2011 | Nogami et al. | 382/103 |
| 2012/0019375 A1* | 1/2012 | Kataoka | 340/439 |
| 2012/0127310 A1* | 5/2012 | Kim | 348/148 |
| 2012/0154591 A1* | 6/2012 | Baur et al. | 348/148 |
| 2012/0219183 A1* | 8/2012 | Mori et al. | 382/103 |
| 2012/0307059 A1* | 12/2012 | Yamakage et al. | 348/148 |
| 2012/0314072 A1* | 12/2012 | Kiyo et al. | 348/148 |
| 2012/0327239 A1* | 12/2012 | Inoue et al. | 348/148 |
| 2013/0085976 A1* | 4/2013 | Bone et al. | 706/46 |
| 2013/0093851 A1* | 4/2013 | Yamamoto et al. | 348/46 |
| 2013/0100287 A1* | 4/2013 | Chien et al. | 348/148 |
| 2013/0116859 A1* | 5/2013 | Ihlenburg et al. | 701/2 |
| 2013/0208119 A1* | 8/2013 | Tseng | 348/148 |
| 2013/0218398 A1* | 8/2013 | Gandhi et al. | 701/31.1 |
| 2013/0246020 A1* | 9/2013 | Zeng | 703/2 |
| 2013/0250114 A1* | 9/2013 | Lu | 348/148 |
| 2013/0286193 A1* | 10/2013 | Pflug | 348/135 |
| 2014/0043473 A1* | 2/2014 | Gupta et al. | 348/135 |
| 2014/0139640 A1* | 5/2014 | Shimizu | 348/46 |

FOREIGN PATENT DOCUMENTS

| | | | |
|---|---|---|---|
| JP | 2013186245 A | * | 9/2013 |
| KR | 20100110096 A | | 10/2010 |
| KR | 20120066901 A | | 6/2012 |

* cited by examiner

APPARATUS AND METHOD FOR TRACKING THE POSITION OF A PERIPHERAL VEHICLE

CROSS-REFERENCE TO RELATED APPLICATION

This application is based on and claims priority under 35 U.S.C. §119(a) from Korean Patent Application No. 10-2012-0122043, filed on Oct. 31, 2012 in the Korean Intellectual Property Office, the disclosure of which is incorporated herein in its entirety by reference.

BACKGROUND OF THE INVENTION

1. Field of the Invention

The present invention relates to an apparatus and a method for tracking a position of a peripheral vehicle, and more particularly, to an apparatus and a method for providing a view-converted image based on a position of a peripheral vehicle.

2. Description of the Prior Art

When driving a vehicle, a driver typically ascertains the position of adjacent/peripheral vehicles by using the rearview mirror and the left and right side mirrors. Unfortunately, the use of such mirrors, in particular the side mirrors, has a significant disadvantage in that the positioning of the mirrors creates a "blind spot" that is not visible by the driver. If a peripheral vehicle is located in the driver's blind spot, that vehicle may evade detection by the driver if the driver relies solely on the left, right, and rearview mirrors.

A conventional solution to this problem has been to mount a camera on the outer portion of the vehicle in a position that enables the camera to image the driver's blind spot. Unfortunately, such conventional art solutions suffer from the disadvantage that the camera is mounted on the outer portion of the vehicle at a fixed angle. Additionally, such conventional art solutions typically implement a wide-angle lens on the camera in order to secure a wider field of vision. Unfortunately, the use of such wide-angle lenses provides an image that is distorted and difficult to interpret. In particular, the use of such wide-angle lenses minimizes the field of view in the resulting image that actually covers the driver's blind spot. As a result, even in the case of such a conventional art solution, a vehicle located in the driver's blind spot may still evade detection, which may result in an accident. Accordingly, there is a need in the art for technology that enables the driver to identify and track vehicles that are located adjacent to the driver's vehicle, and especially vehicles located in the driver's blind spot.

SUMMARY OF THE INVENTION

Accordingly, the present invention provides an apparatus and a method for tracking the position of a peripheral/adjacent vehicle capable of allowing a user to recognize the position of the peripheral vehicle through a view-converted image by converting a view of a peripheral image based on the position of the peripheral vehicle and providing the view-converted image to the user. Additionally, the present invention provides an apparatus and a method for tracking the position of a peripheral vehicle allowing the position of the peripheral vehicle to be easily recognized by the driver by providing an image view-converted so that an image of the detected peripheral vehicle is positioned at the center of the peripheral image.

In one aspect of the present invention, an apparatus for tracking a position of a peripheral vehicle includes: a peripheral vehicle detecting unit that analyzes a peripheral image obtained from a camera provided on the vehicle to detect a peripheral vehicle in the peripheral image; a position tracking unit to track the position of the peripheral vehicle detected in the peripheral image; a view converting unit generating a view-converted image by converting a view of the peripheral image based on the tracked position of the peripheral vehicle; and an output controlling unit allowing the view-converted image to be output through a display provided in the vehicle.

The view converting unit may dispose an image of the peripheral vehicle in the view-converted image so as to be positioned at the center of the view-converted image. The view converting unit may crop the remaining region of the image except for the peripheral vehicle in the view-converted image. The view converting unit may generate the view-converted image so as to include information on a positional relationship between the vehicle and the peripheral vehicle.

The position tracking unit may update positional information of the peripheral vehicle in real time during a period in which the peripheral vehicles is detected in the peripheral image.

In another aspect of the present invention, there is provided a method for tracking a position of a peripheral vehicle, the method including: analyzing a peripheral image obtained from a camera provided on the vehicle to detect a peripheral vehicle in the peripheral image; tracking the position of the peripheral vehicle detected in the peripheral image; generating a view-converted image by converting a view of the peripheral image based on the tracked position of the peripheral vehicle; and allowing the view-converted image to be output to a display provided in the vehicle.

In generating the view-converted image, an image of the peripheral vehicle in the view-converted image may be disposed so as to be positioned at the center of the view-converted image. The method may further include cropping the remaining region of the image, with the exception of the peripheral vehicle, in the view-converted image. In generating the view-converted image, the view-converted image may be generated so as to include information on a position relationship between the vehicle and the peripheral vehicle.

In tracking the position of the peripheral vehicle, positional information of the peripheral vehicle may be updated in real time during a period in which the peripheral vehicles is detected in the peripheral image.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
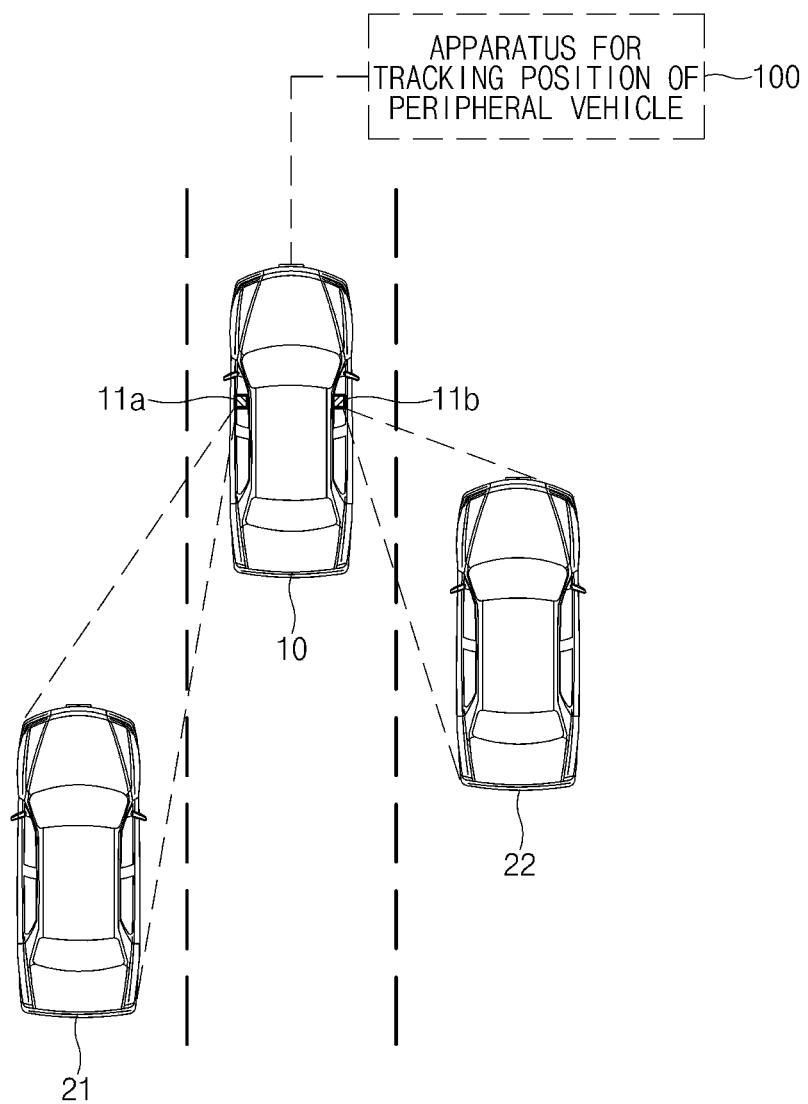
FIG. 1 illustrates an example situation in which an apparatus for tracking the position of a peripheral vehicle according to an exemplary embodiment of the present invention may be applied.

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Ranges provided herein are understood to be shorthand for all of the values within the range. For example, a range of 1 to 50 is understood to include any number, combination of numbers, or sub-range from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

Additionally, it is understood that the below methods are executed by at least one controller. The term controller refers to a hardware device that includes a memory and a processor. The memory is configured to store the modules and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

FIG. 1 illustrates an example situation in which an apparatus for tracking the position of a peripheral vehicle according to an exemplary embodiment of the present invention may be applied. Referring to FIG. 1, the left and right sides of a vehicle 10 may be provided with cameras 11a and 11b photographing peripheral images of the vehicle. The cameras 11a and 11b are operated when the vehicle 10 starts, and are configured to photograph moving objects in the vicinity of the vehicle 10 in real time (e.g., peripheral vehicles, vehicles located in the driver's blind spot, etc.). Although the moving objects are described as peripheral vehicles 21 and 22 in an exemplary embodiment of the present invention, it is contemplated within the scope of the disclosure that the moving objects may be any objects moving in the vicinity of the vehicle such as a pedestrian, bicycle, or the like.

The peripheral images photographed by the cameras 11a and 11b provided at the left and the right sides of the vehicle 10 may be transferred to apparatus 100 for tracking a position of a peripheral vehicle, and the apparatus 100 for tracking a position of a peripheral vehicle tracks positions of the peripheral vehicles 21 and 22 based on the peripheral images photographed by the cameras 11a and 11b provided at the left and the right sides of the vehicle, generates view-converted images by converting views of the peripheral images based on the tracked positions of the peripheral vehicles 21 and 22, and provides the generated view-converted images to a user in real time. Since the view-converted images provided to the user are images view-converted based on the positions of the peripheral vehicles, the user may more easily recognize the positions of the peripheral vehicles.

Apparatus 100 for tracking a position of a peripheral vehicle may be implemented in a variety of configuration. For example, apparatus 100 may be implemented in vehicle 10 as a modularized part of a vehicle control unit. Additionally, apparatus 100 may be implemented in the form of a separate module, and then connected to the vehicle control unit. In another exemplary embodiment, apparatus 100 may be implemented as an external apparatus, and then connected to the vehicle control unit through an interface unit provided in a front panel, or the like, of the vehicle 10. As described above, the form in which apparatus 100 is implemented in the vehicle 10 is not limited to any one form.

Figure 2:
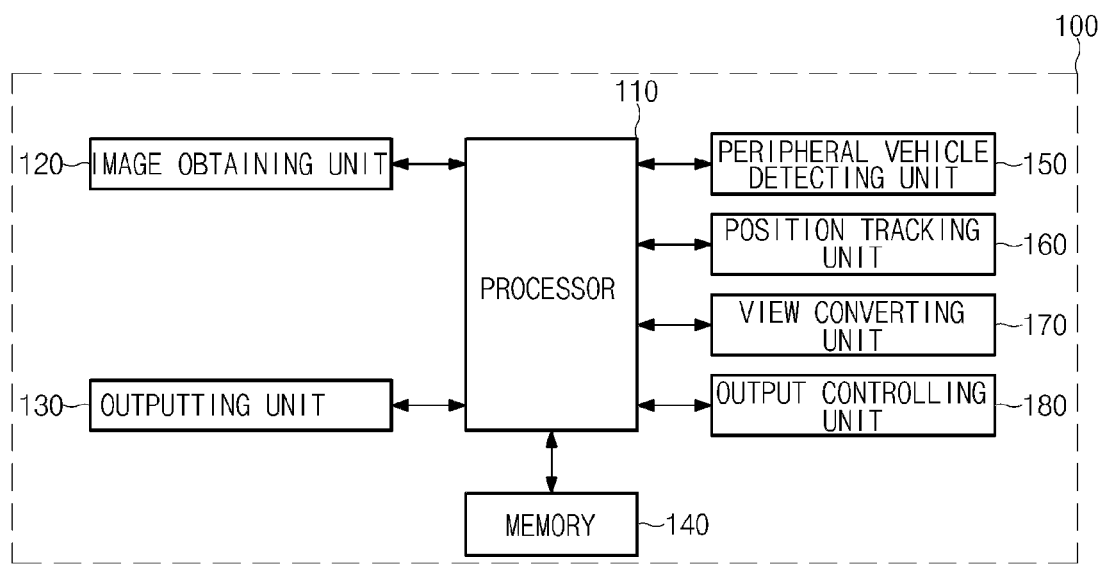
FIG. 2 is a block diagram showing a configuration of the apparatus for tracking a position of a peripheral vehicle according to an exemplary embodiment of the present invention.

Therefore, a configuration of the apparatus 100 (e.g., a controller) for tracking a position of a peripheral vehicle providing the view-converted images based on the positions of the peripheral vehicles 21 and 22 to the user will be described in detailed with reference to FIG. 2, which is a block diagram showing a configuration of the apparatus for tracking a position of a peripheral vehicle according to the exemplary embodiment of the present invention. Referring to FIG. 2, the apparatus 100 for tracking a position of a peripheral vehicle according to the exemplary embodiment of the present invention is configured to include a processor 110 and memory 140. In an exemplary embodiment, the apparatus may include a plurality of units (e.g., software modules) executed by the processor, the units including: an image obtaining unit 120, an outputting unit 130, a peripheral vehicle detecting unit 150, a position tracking unit 160, a view converting unit 170, and an output controlling unit 180. Here, the processor 110 controls operations of each unit of the apparatus for tracking a position of a peripheral vehicle.

The image obtaining unit 120 obtains peripheral images of the vehicle photographed by at least one camera provided at the vehicle. Here, the image obtaining unit 120 obtains the peripheral images photographed with respect to moving peripheral vehicles at a predetermined time interval, e.g., the time interval may range from 1-1,000 milliseconds, 1-60 seconds, etc.

Here, the cameras provided on the vehicle may be cameras disposed on the front, the rear, the left, and/or the right sides of the vehicle. Further, the cameras provided on the vehicle may be cameras disposed in other directions, in addition to the cameras disposed at the front, the rear, the left, and the right of the vehicle. The image obtaining unit 120 is configured to allow the peripheral images for the front, the rear, the left, and the right sides of the vehicle photographed by the cameras disposed at the front, the rear, the left, and the right sides of the vehicle to be stored in the memory 140.

The outputting unit 130 is connected to a display unit to output a view-converted image from the view converting unit 170 to the display unit. Here, the display unit may be a monitor, a navigation system, and the like, provided in the vehicle. In addition, the display unit may be disposed at a position at which it is easily confirmed by a user during driving of the vehicle.

Illustratively, one display unit may be disposed at the center of a front panel of the vehicle or two display units may be disposed in the vicinity of left and right windows of the vehicle or at positions corresponding to those of side mirrors at an inner portion of the vehicle. Therefore, a process of outputting a view-converted image through the display unit will be described in detail with reference to FIGS. 4 and 5.

Memory 140 stores a setting value for an operation of the apparatus for tracking a position of a peripheral vehicle, or the like, therein. In addition, memory 140 may store the peripheral images obtained by the image obtaining unit 120 and the view-converted images view-converted by the view converting unit 170 therein. In addition, memory 140 may also store information extracted from the respective images and position information of the peripheral vehicles tracked by the position tracking unit 160 therein.

The peripheral vehicle detecting unit 150 analyzes the peripheral images obtained from the cameras provided at the vehicle to detect the peripheral vehicles in the peripheral images. As an example, the peripheral vehicle detecting unit 150 may detect moving peripheral vehicles from a difference image between two or more peripheral images. A scheme of detecting the peripheral vehicles from the peripheral images in the peripheral vehicle detecting unit 150 is not limited to any one scheme, but may be any scheme of detecting a moving object by image analysis.

The position tracking unit 160 tracks the positions of the peripheral vehicles detected in the peripheral images. In this case, the position tracking unit 160 updates position information of the peripheral vehicles in real time during a period in which the peripheral vehicles are detected in the peripheral images. In other words, the position tracking unit 160 updates the position information of the moving peripheral vehicles in real time as long as the peripheral vehicles are present in photographing regions of the cameras provided at the vehicle. As an example, the position tracking unit 160 updates the position information of the peripheral vehicles at a predetermined interval until the peripheral vehicles move from the left rear of the vehicle to the left front thereof.

Here, the position tracking unit 160 may track the positions of the peripheral vehicles based on camera setting values and attitude information, coordinate information of the peripheral vehicles, or the like, and track the positions of the peripheral vehicles based on sensor values obtained from a plurality of sensors provided on the vehicle. A scheme in which the position tracking unit 160 tracks the positions of the peripheral vehicles is not limited to any one scheme, but may be any scheme applied to detect the positions of the peripheral vehicles. The view converting unit 170 converts views of the peripheral images based on the positions of the peripheral vehicles tracked by the position tracking unit 160 to generate view-converted images. In this case, the view converting unit 170 implements a mathematical model generated based on position and attitude information of the cameras provided at the vehicle and implements a virtual camera based on the generated mathematical model. Therefore, the view converting unit 170 converts a view of the virtual camera according to the tracked position of the peripheral vehicle to generate the view-converted image for an original peripheral image.

In this case, the view converting unit 170 disposes an image of the peripheral vehicle in the view-converted image so as to be positioned at the center of the view-converted image. Meanwhile, the view converting unit 170 may also crop the remaining region other than the image of the peripheral vehicle in the view-converted image.

In addition, the view converting unit 170 defines a position relationship between the vehicle and the peripheral vehicle based on the position information of the corresponding vehicle and the tracked position information of the peripheral vehicle and allows information on the position relationship between the vehicle and the peripheral vehicle to be included in the view-converted image at the time generating the view-converted image. A position at which the information on the position relationship between the vehicle and the peripheral vehicle is displayed in the view-converted image may be any position in the view-converted image.

Meanwhile, when the position information of the peripheral vehicle is updated by the position tracking unit 160, the view converting unit 170 generates the view-converted image for the peripheral vehicle at an updated position based on the peripheral image obtained by the image obtaining unit 120 and the updated position information of the peripheral vehicle. A process of generating the view-converted image according to the position of the peripheral vehicle in the view converting unit 170 will be described in detail with reference to FIGS. 3A to 3D.

The output controlling unit 180 allows the view-converted image generated by the view converting unit 170 to be output through the outputting unit 130. Here, the view-converted image output through the outputting unit 130 may be displayed by the display provided in the vehicle.

FIGS. 3A to 3D are illustrative diagrams for describing a view converting operation of the apparatus for tracking a position of a peripheral vehicle according to the exemplary embodiment of the present invention. Although an example of FIGS. 3A to 3D is described based on an image obtained in a side direction of the vehicle among the peripheral images obtained by the apparatus for tracking a position of a peripheral vehicle, it may be applied to various directions according to exemplary embodiments.

Referring to FIGS. 3A to 3D, original images shown in FIGS. 3A to 3D are peripheral images obtained by photographing, with a camera provided at a vehicle, peripheral vehicles at a predetermined time interval. Here, an angle of the camera photographing the peripheral image is fixed. The apparatus for tracking a position of a peripheral vehicle detects each of the peripheral vehicles in the peripheral images shown in FIGS. 3A to 3D to track positions of the peripheral vehicles detected in the peripheral images and converts a view of a virtual camera based on the tracked position.

Figure 3:
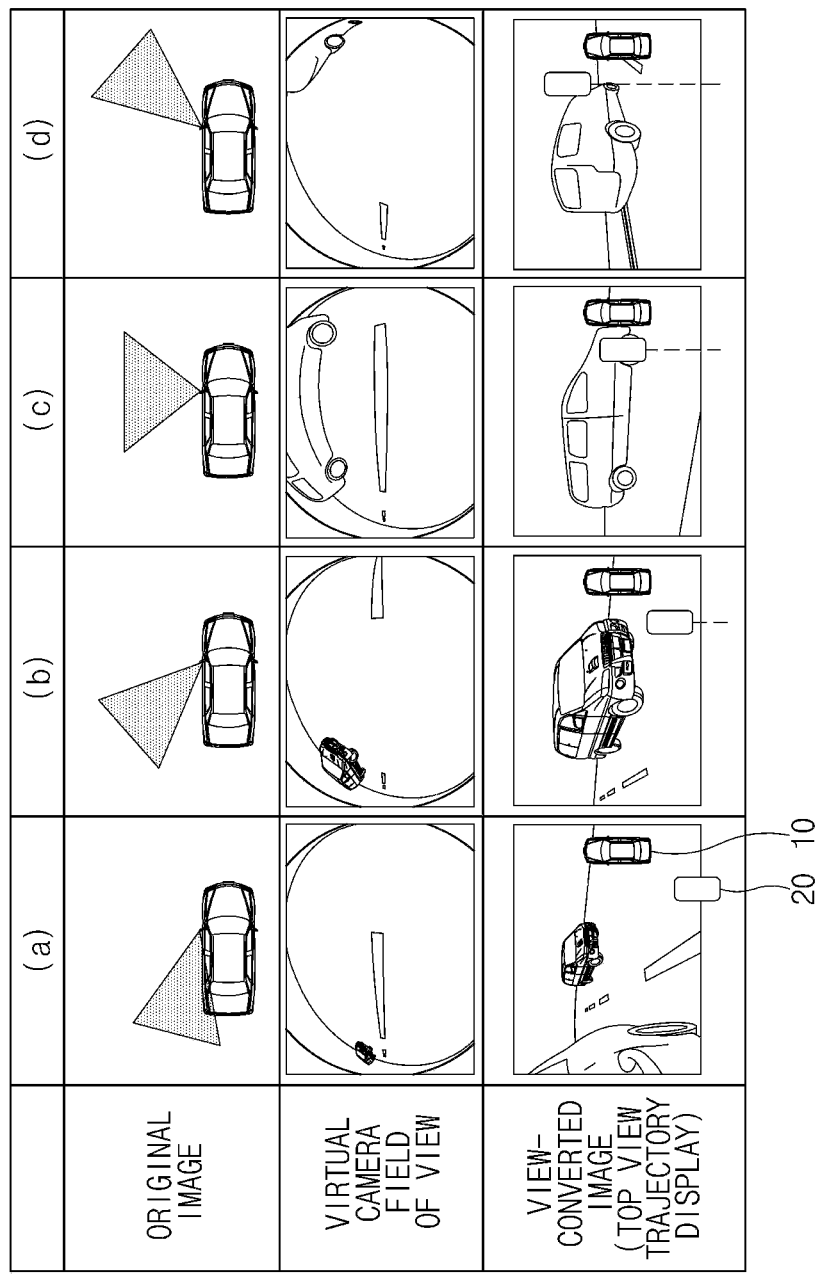
FIGS. 3A to 3D are illustrative diagrams for describing a view converting operation of the apparatus for tracking a position of a peripheral vehicle according to an exemplary embodiment of the present invention.

In the original image shown in FIG. 3A, since the peripheral vehicle is positioned at the left rear of the corresponding vehicle, the apparatus for tracking a position of a peripheral vehicle converts the view of the virtual camera so as to be appropriate for the left rear of the vehicle. In addition, in the original image shown in FIG. 3B, since the peripheral vehicle is positioned at the left rear of the corresponding vehicle but is positioned at the front as compared with the position of FIG. 3A, the apparatus for tracking a position of a peripheral vehicle converts the view of the virtual camera so as to be appropriate for the tracked position of the peripheral vehicle.

Further, in the original image shown in FIG. 3C, since the peripheral vehicle is positioned at the left of the corresponding vehicle, the apparatus for tracking a position of a peripheral vehicle converts the view of the virtual camera so as to be appropriate for the left of the vehicle. Further, in the original image shown in FIG. 3D, since the peripheral vehicle is positioned at the left front of the corresponding vehicle, the apparatus for tracking a position of a peripheral vehicle converts the view of the virtual camera so as to be appropriate for the left front of the vehicle.

As described above, the apparatus for tracking a position of a peripheral vehicle converts the views of the virtual camera based on the tracked positions of the peripheral vehicle and applies the respective original images to the view-converted virtual camera so as to be appropriate for the positions of the peripheral vehicle, thereby generating the view-converted images. Here, the generated respective view-converted images correspond to view-converted images shown in FIGS. 3A to 3D.

The apparatus for tracking a position of a peripheral vehicle may define a positional relationship between the corresponding vehicle and the peripheral vehicle at a time in point at which the respective original images are obtained and allow the defined position relationship to be displayed on the view-converted image. Here, the positional relationship between the corresponding vehicle and the peripheral vehicle may be displayed in a top view form and be displayed together with a moving trajectory of the peripheral vehicle. For example, the information included in the image may be the distance of the peripheral vehicle from the vehicle, or the positional angle of the peripheral vehicle relative to the vehicle (e.g., angle of approach or departure of the peripheral vehicle, whether the lateral distance between the vehicles is diminishing, e.g., the peripheral vehicle is changing lanes into the vehicle, etc.). Positional information may also include the direction of movement of the peripheral vehicle, e.g., is the peripheral vehicle passing, or being passed.

Figure 4:
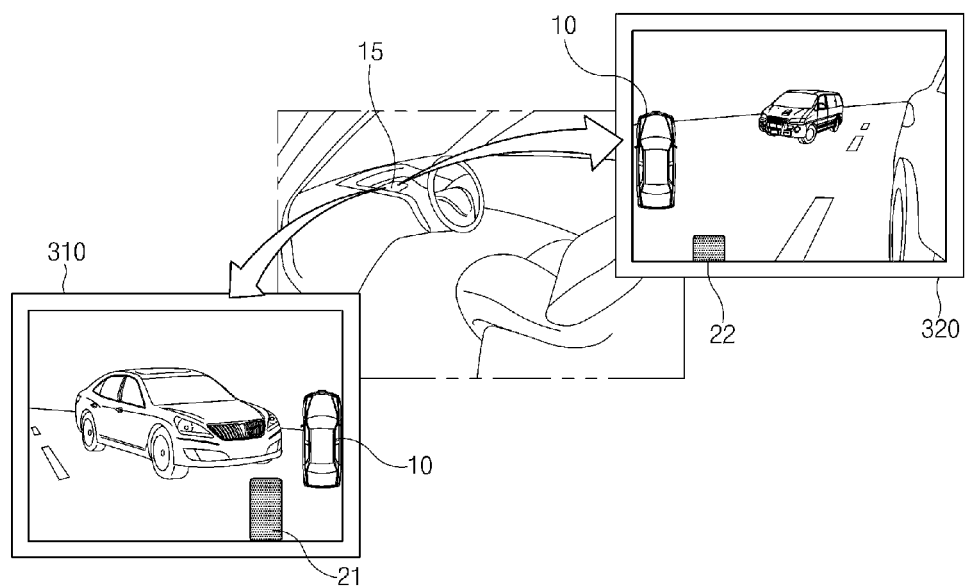
FIGS. 4 and 5 are illustrative diagrams showing an example of providing a view-converted image in the apparatus for tracking a position of a peripheral vehicle according to an exemplary embodiment of the present invention.
Figure 5:
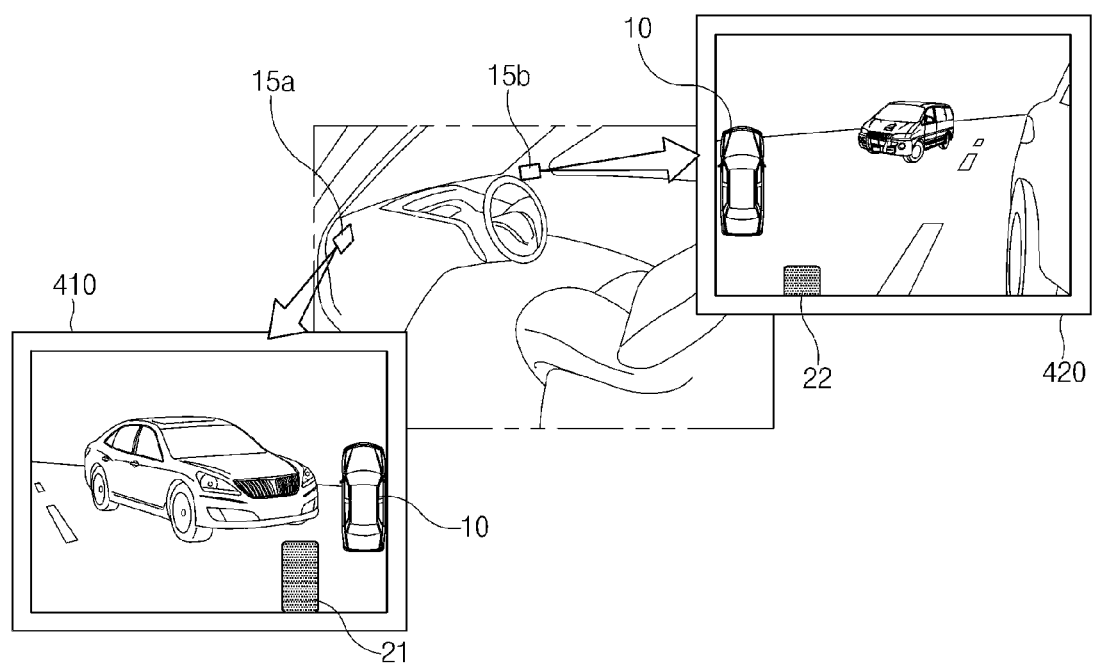

FIGS. 4 and 5 are illustrative diagrams showing an example of providing a view-converted image in the apparatus for tracking a position of a peripheral vehicle according to the exemplary embodiment of the present invention.

First, FIG. 4 shows an example in which a display unit is disposed at the center of a front panel of the vehicle. Referring to FIG. 4, the apparatus for tracking a position of a peripheral vehicle allows the view-converted images view-converted based on the positions of the peripheral vehicles with respect to the peripheral image obtained at the left or the right of the vehicle to be displayed through the display unit disposed at the center of the front panel.

Here, a screen of the display unit is divided into two screens, such that a view-converted image for a left peripheral vehicle and a view-converted image for a right peripheral vehicle may be displayed through the divided screens, respectively.

Therefore, a driver may easily recognize a position relationship between the vehicle and the peripheral vehicles positioned at the left and the right of the vehicle through the left view-converted image and the right view-converted image displayed on the display unit.

Meanwhile, FIG. 5 shows an example in which two display units are disposed at both sides of the front panel of the vehicle, respectively. Referring to FIG. 5, the apparatus for tracking a position of a peripheral vehicle allows the view-converted images view-converted based on the positions of the peripheral vehicles with respect to the peripheral images obtained at the left and the right of the vehicle to be displayed through a first display unit disposed at the left of the front panel and a second display unit disposed at the right of the front panel, respectively.

In other words, the apparatus for tracking a position of a peripheral vehicle may allow the view-converted image for the left peripheral vehicle to be displayed through the first display unit and allow the view-converted image for the right peripheral vehicle to be displayed through the second display unit.

Therefore, a driver may easily recognize a position relationship between the vehicle and the peripheral vehicles positioned at the left and the right of the vehicle through the left view-converted image and the right view-converted image displayed on the first and second display units.

An operation flow of the apparatus for tracking a position of a peripheral vehicle according to the exemplary embodiment of the present invention configured as described above will be described below in detail.

Figure 6:
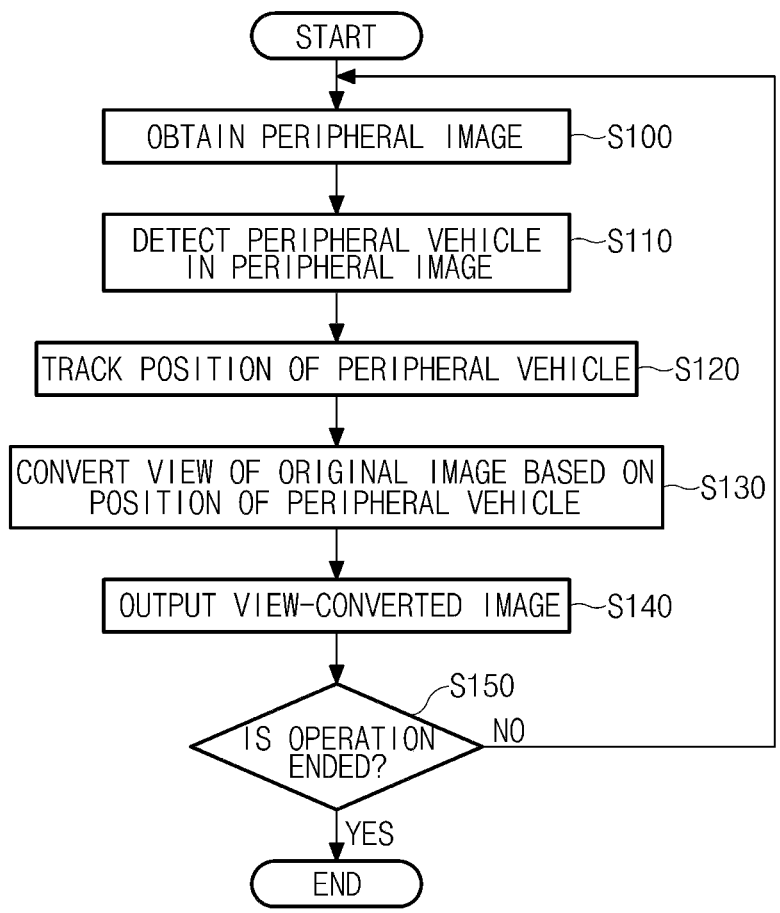
FIG. 6 is a flow chart showing an operation flow of a method for tracking a position of a peripheral vehicle according to an exemplary embodiment of the present invention.

FIG. 6 is a flow chart showing an operation flow of a method for tracking a position of a peripheral vehicle according to an exemplary embodiment of the present invention. Referring to FIG. 6, the apparatus for tracking a position of a peripheral vehicle according to the exemplary embodiment of the present invention obtains a peripheral image photographed by a camera provided at a side of the vehicle (S100). Then, the apparatus for tracking a position of a peripheral vehicle detects a peripheral vehicle in the peripheral image obtained in step S100 (S110) and tracks a position of the peripheral vehicle detected in step S110 (S120). Next, the apparatus for tracking a position of a peripheral vehicle converts a view of an original image obtained in step S100 based on the position of the peripheral position tracked in step S120 to generate a view-converted image (S130) and allows the view-converted image generated in step S130 to be output through a display unit provided in the vehicle (S140). Steps S100 to S140 are repeatedly performed until an operation end command is input. Therefore, the apparatus for tracking a position of a peripheral vehicle updates a position of a moving peripheral vehicle in real time, generates a view-converted image based on the updated position of the peripheral vehicle, and provides the generated view-converted image to the user in real time. Meanwhile, when the operation end command is input by starting-off, manipulation of a separate switch, or the like (S150), the apparatus for tracking a position of a peripheral vehicle ends a corresponding operation.

According to the exemplary embodiment of the present invention, the view of the peripheral image is converted based on the position of the peripheral vehicle and then provided to the user, such that the user may recognize the position of the peripheral vehicle through the view-converted image.

In addition, according to the exemplary embodiment of the present invention, the image view-converted so that the image of the peripheral vehicle detected in the peripheral image is positioned at the center of the peripheral image is provided to the user, such that the position of the peripheral vehicle may be easily recognized.

Although the apparatus and the method for tracking a position of a peripheral vehicle according to the exemplary embodiment of the present invention have been described with reference to the accompanying drawings, the present invention is not limited to the exemplary embodiment and the accompanying drawings disclosed in the present specification, but may be modified without departing from the scope and spirit of the present invention.

What is claimed is:

1. An apparatus for tracking a position of a peripheral vehicle, the apparatus comprising:
    a memory configured to store program instructions; and
    a processor configured to execute the program instructions, the program instructions when executed configured to;
        receive one or more images from one or more cameras disposed on a vehicle;
        analyze the one or more images to detect a peripheral vehicle in the one or more images;
        track a position of the peripheral vehicle detected in the one or more images;
        implement a virtual camera based on position and attitude information of the cameras, and convert a view of the virtual camera according to the position of the peripheral vehicle detected in the peripheral images to generate a view-converted image for the peripheral; and
        output the view-converted image to a display provided in the vehicle,
    wherein the image of the peripheral vehicle is positioned at the center of the view-converted image, and
    wherein the view converting unit defines a position relationship between the vehicle and the peripheral vehicle, and displays an image corresponding to the defined position relationship between the vehicle and the peripheral vehicle on the view-converted image.

2. The apparatus according to claim 1, wherein the program instructions when executed are further configured to crop the view-converted image so that only the peripheral vehicle remains in the view-converted image.

3. The apparatus according to claim 1, wherein the image corresponding to the defined position relationship between the vehicle and the peripheral vehicle is displayed with a moving trajectory of the peripheral vehicle on the view-converted image.

4. The apparatus according to claim 3, wherein the information is selected from the group consisting of distance from the vehicle, positional angle relative to the vehicle, and movement direction relative to the vehicle.

5. The apparatus according to claim 1, wherein the program instructions when executed are further configured to update positional information of the peripheral vehicle in real time during a period in which the peripheral vehicles is detected in the peripheral image.

6. A method for tracking a position of a peripheral vehicle, the method comprising:
    receive one or more images from one or more cameras disposed on a vehicle;
    analyzing the one or more images to detect a peripheral vehicle in the one or more images;
    tracking a position of the peripheral vehicle detected in the one or more images;
    implementing a virtual camera based on position and attitude information of the cameras, and converting a view of the virtual camera according to the position of the peripheral vehicle detected in the peripheral images to generate a view-converted image for the peripheral; and
    outputting the view-converted image to a display provided in the vehicle,
    wherein the image of the peripheral vehicle is positioned a center of the view-converted image, and
    wherein an image corresponding to a position relationship defined between the vehicle and the peripheral vehicle is displayed on the view-converted image.

7. The method according to claim 6, further comprising cropping the view-converted image so that only the image of the peripheral vehicle remains in the view-converted image.

8. The method according to claim 6, wherein the image corresponding to the defined position relationship between the vehicle and the peripheral vehicle is displayed with a moving trajectory of the peripheral vehicle on the view-converted image.

9. The method according to claim 8, wherein the information is selected from the group consisting of distance from the vehicle, positional angle relative to the vehicle, and movement direction relative to the vehicle.

10. The method according to claim 8, wherein the positional information is updated in real time during a period in which the peripheral vehicles is detected in the peripheral image.

* * * * *